UNITED STATES PATENT OFFICE.

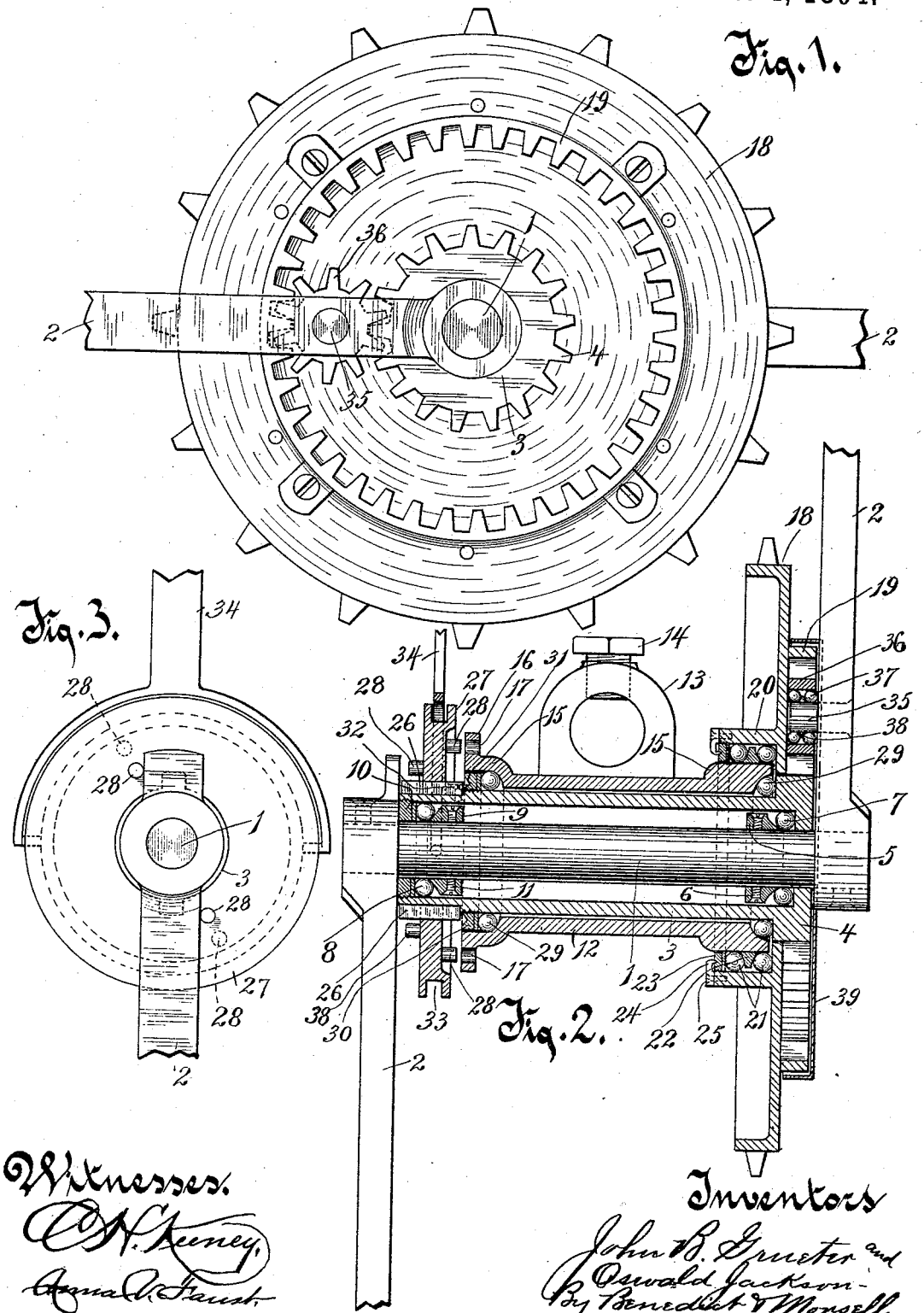

JOHN BONIFACE GRUETER AND OSWALD JACKSON, OF CARROLLTON, ILLINOIS.

SPEED-MULTIPLYING GEARING FOR BICYCLES OR OTHER MACHINES.

SPECIFICATION forming part of Letters Patent No. 530,103, dated December 4, 1894.

Application filed March 3, 1894. Serial No. 502,165. (No model.)

*To all whom it may concern:*

Be it known that we, JOHN BONIFACE GRUE-TER and OSWALD JACKSON, of Carrollton, in the county of Greene and State of Illinois, have invented a new and useful Improvement in Speed-Multiplying Gearing for Bicycles or other Machines, of which the following is a description, reference being had to the accompanying drawings, which are a part of this specification.

Our invention has relation to improvements in speed multiplying gearings for bicycles, and other machines.

The object of the invention is to provide a construction wherein provision is made for driving the sprocket chain at the same rate of speed as the cranks revolve, increasing the speed of the bicycle, or other machine, from twenty-five per cent. to seventy-five per cent. according to the gears used, with the same movement of the treadles, and providing for "coasting" without movement of the treadles.

With the above object, and others, in view, the invention consists in the devices and parts, or their equivalents, as hereinafter described and claimed.

In the accompanying drawings, Figure 1, is an end or side elevation of the device. Fig. 2, is a central horizontal section of Fig. 1, and Fig. 3, is an elevation of the opposite end to that shown in Fig. 1.

Like numerals of reference denote like parts throughout the several views.

Referring to the drawings, the numeral 1 indicates the main axle having rigidly mounted at opposite ends the crank arms 2, 2. Surrounding the axle loosely is a sleeve 3, said sleeve having formed integral with one end, or rigidly attached thereto, a central gear wheel 4. Between the sleeve 3 and the shaft 1 are two collars 5 and 9, held in position by means of set-screws 6 and 11, so that anti-friction balls 7 and 8 may take bearing (at the right hand end) between collar 5 and the end of the sleeve, and (at the opposite end) between collar 9 and collar 10. This collar 10 has a threaded connection with sleeve 3, and is held in position by a set-screw (not shown) which passes through the sleeve. Now it will be readily seen that by tightening this collar 10, it presses balls 8 against collar 9, which draws sleeve 3 until balls 7 are against collar 5, which takes up all lost motion.

Surrounding the sleeve 3 is a rigid frame 12, which is provided medially with an upward-projecting hub 13, through which extends a set screw 14, providing means for conveniently attaching the device to a bicycle frame. This particular form of frame, however, is not essential, inasmuch as the hub may be a part of the main frame of the bicycle, as is customary in bicycles of the ordinary form. The opposite ends of the frame are curved upward, as indicated at 15, 15, and the curved end at the left is provided with an annular flange 16, having apertures 17, 17 at diametrically opposite points.

Mounted loosely on the sleeve 3 is a large sprocket wheel 18, which is adapted to receive a sprocket chain (not shown) for conveying motion in the usual manner. The outer face of this wheel is provided with an outstanding series of annularly arranged teeth, forming a rigid gear wheel 19. The inner face of the sprocket wheel is formed with an annular flange 20, between which and the end of the frame are arranged anti-friction balls 21, which are separated into two annular divisions by means of a collar 22 fitting tightly in the frame, and having its opposite faces curved or beveled. The wear in the balls 21 is provided for by the collar 23 engaging inner threads of the annular flange 20. Now by tightening this collar the innermost series of balls is pressed against one side of the collar 22, and draws the outer series against the other side and the inner face of the sprocket wheel. This collar 23, in turn, is held to place by means of hooked pins 24, 24, secured to the end of the annular flange 20 by means of screws 25, 25.

Upon the left hand end, of the sleeve 3, at diametrically opposite points, are splines or feathers 26, 26, which fit into registering grooves in an annular clutch collar 27, said collar, therefore, adapted to have a longitudinal movement on the sleeve 3, and to turn with said sleeve when the latter is rotated. This clutch collar is provided upon opposite faces with laterally-projecting pins 28, said pins arranged in a diagonal line with respect to each other. The pins on the right hand face are adapted to be thrown into engagement with the apertures 17, 17 of the flange 16, when the clutch collar is thrown to the right, and the pins on the left hand face are adapted to engage opposite edges of the crank arm 2, when the clutch is shifted to the left. Beneath the opposite upward curved ends 15, 15 of the frame are anti-friction balls 29. The balls on the right are held between the curved surface and the inner face of a shoulder or fixed collar on right hand end of sleeve 3 and the balls on the left are held between the curved surface at that end and a threaded collar 30, which collar engages threads outside of the sleeve. The outer face of this collar is provided with an annular V-shaped recess 31, which the head of a screw 32 engages, said screw passing through one of the splines or feathers 26, and entering the sleeve 3. This screw serves the purpose of holding the collar 30 to the different positions to which it may be adjusted for taking up wear.

The clutch collar 27 is provided with an annular groove 33, which receives the forked end of a shifting lever 34, the free end of said shifting lever being in convenient position for manipulation.

The right hand crank arm 2 is provided medially with an inward-extending stud 35 on which is mounted loosely a small pinion 36, anti-friction balls 37 being disposed between the hub of the pinion and the stud, a central rigid collar 38 on the stud serving to separate the balls into two annular divisions. This pinion occupies a position intermediate the central gear wheel 4 and the gear 19, so as to mesh therewith.

In Fig. 2 is shown clearly a casing 39, which serves to protect the gearing, and prevent the same from being clogged up by the entrance of dirt, or other matter.

The above being a description of the construction of our improved gearing, its operation will now be described.

In Fig. 2 the clutch collar 27 is shown as occupying an intermediate position between the left hand crank arm 2, and the annular apertured flange 16. In this position, the central gear wheel 4, and the sprocket wheel 18 and its rigid gear 19, are both loose upon the axle. By this adjustment of the clutch an important advantage is gained, inasmuch as the rider can "coast" without the treadles moving, the pinion 36 acting as an idler. When, however, the shifting lever is operated so as to throw the clutch collar over to the left to cause the left hand pins 28 to engage the left hand crank arm 2, as illustrated in Fig. 3, the sleeve 3, and consequently the gear wheel 4, are made fast with the axle 1 owing to the fact that said crank-arm is fast to the axle. Pinion 36 being geared into wheels 4 and 19 has the effect, practically, of also holding sprocket 18 fast to the main axle 1, thus driving the sprocket wheel at the same rate of speed as the crank revolves. Now by shifting the clutch collar 27 to the right so as to make the right hand pins 28 engage the apertures 17 of the annular flange 16 of the frame, the gear wheel 4 is necessarily held stationary to the frame. This permits the pinion 36 carried by the stud 35 of the right hand crank 2, as said crank is revolved, to revolve around the central gear 4, thus multiplying the speed of the gear wheel 19, which is fast to the sprocket wheel 18, and increasing the speed of the bicycle from twenty-five per cent. to seventy-five per cent. according to the gears used with the same movement of the treadle.

It will be seen that the several movements above described are accomplished in an exceedingly simple manner, and by a construction which involves the least possible amount of complexity.

Having thus described our invention, what we claim, and desire to secure by Letters Patent, is—

1. In a speed multiplying gearing for bicycles, and other machines, the combination, of a main axle, a sleeve loosely mounted thereon, a gear rigidly mounted upon the sleeve, a rigid frame, means for holding the sleeve into locked engagement with the frame, a wheel mounted loosely upon the frame, said wheel provided with rigid teeth, a crank upon the end of the axle, and a pinion carried by the crank, said pinion adapted to mesh with the two gear wheels, substantially as set forth.

2. In a speed multiplying gear for bicycles, and other machines, the combination, of a main axle, a sleeve loosely mounted thereon, a gear rigidly mounted upon the sleeve, a rigid frame a wheel loosely surrounding the frame, said wheel provided with rigid teeth, cranks at opposite ends of the main axle, a pinion carried by one of the cranks, and adapted to mesh with the two gear wheels, and a clutch slidable longitudinally on the sleeve, and rotatable therewith, said clutch adapted to be thrown into engagement with the continuous crank, or into engagement with the rigid frame, or to occupy an intermediate position between the two, substantially as set forth.

3. In a speed multiplying gear for bicycles, and other machines, the combination, of a main axle, a sleeve loosely mounted thereon, a gear rigidly mounted upon the sleeve, a rigid frame having opposite upward curved ends a wheel loosely surrounding the frame, said wheel provided with rigid teeth, cranks at opposite ends of the main axle, a pinion carried by one of the cranks, said pinion adapted to mesh with the gear wheels, anti-friction balls resting on the loose sleeve, and confined between one of the upward curved ends of the frame and the shoulder or collar on sleeve, anti-friction balls between the opposite end of the sleeve and the adjacent upward curved end of the frame, a set collar bearing against the balls, and a clutch slidable longitudinally on the sleeve, and rotatable therewith, said clutch adapted to be thrown into engagement with the continuous crank, into engagement with the rigid frame, or to occupy an intermediate position between the two, substantially as set forth.

4. In a speed multiplying gearing for bicycles, and other machines, the combination, of a main axle, a sleeve loosely mounted thereon, a gear rigidly mounted upon the sleeve, a rigid frame, means for holding the sleeve into locked engagement with the frame, a wheel mounted loosely upon the frame, said wheel provided with rigid teeth, a crank upon the end of the axle, said crank provided with a laterally-extending stud, a pinion mounted upon the stud, said pinion adapted to mesh with the two gear wheels, and anti-friction balls between the hub of the pinion and the stud, substantially as set forth.

5. In a speed multiplying gear for bicycles, and other machines, the combination, of a main axle, a sleeve loosely mounted thereon, a gear rigidly mounted upon the sleeve, a rigid frame, means for throwing the sleeve into and out of locked engagement with the frame, a wheel mounted loosely upon the frame, said wheel provided upon one face with annularly arranged outstanding teeth, and upon its opposite face with an annular flange, anti-friction balls between the annular flange and the outside of the upward curved end of the rigid frame, an adjusting collar having threaded connection inside said annular flange for taking up wear of the balls, a crank upon the end of the axle, and a pinion carried by the crank, said pinion meshing with the gear wheels, substantially as set forth.

6. In a speed multiplying gear for bicycles, and other machines, the combination, of a main axle, a sleeve loosely mounted thereon, a gear rigidly mounted upon the sleeve, anti-friction balls between the sleeve and shaft, set collars, a threaded collar for adjusting said balls, a rigid frame, means for throwing the sleeve into and out of locked engagement with the rigid frame, a wheel mounted loosely upon the frame, said wheel provided with annularly arranged outstanding teeth, a crank upon the end of the axle, and a pinion carried by the crank, said pinion meshing with the gear wheels, substantially as set forth.

7. In a speed multiplying gearing for bicycles, and other machines, the combination, of a main axle, a sleeve loosely surrounding the axle, said sleeve provided with a rigid gear wheel, a rigid frame a sprocket or driving wheel loosely surrounding the frame, said wheel formed with a rigid gear wheel, cranks upon opposite ends of the axle, a pinion carried by one of the cranks, said pinion meshing with the gear wheels, and a clutch slidable longitudinally upon the sleeve, and rotatable therewith, said clutch adapted to be thrown into engagement with the contiguous crank arm, or into engagement with the rigid frame, or to occupy an intermediate position between the two, and means for actuating said clutch, substantially as set forth.

8. In a speed multiplying gearing for bicycles, and other machines, the combination, of a main axle, a sleeve loosely surrounding said axle, said sleeve provided with a rigid gear wheel, a rigid frame provided at one end with apertures a sprocket or driving wheel loosely surrounding the frame, said sprocket or driving wheel formed with a rigid gear wheel, cranks rigidly connected to opposite ends of the axle, a pinion carried by one of the cranks, said pinion meshing with the gear wheels, a clutch collar sliding on splines or feathers on the sleeve, said collar provided on opposite faces with projecting pins, and means for actuating the clutch collar whereby the pins upon one face thereof are adapted to embrace opposite edges of the contiguous crank, when the collar is slid in one direction, and the pins upon the opposite face of the clutch adapted to engage the apertures of the frame, when the clutch is slid in the opposite direction, substantially as set forth.

In testimony whereof we affix our signatures in presence of two witnesses.

JOHN BONIFACE GRUETER.
OSWALD JACKSON.

Witnesses:
MARTIN JOHN KOUGHAN,
JAMES MOORE CHENOWITH.

It is hereby certified that in Letters Patent No. 530,103, granted December 4, 1894, upon the application of John Boniface Grueter and Oswald Jackson, of Carrollton, Illinois, for an improvement in "Speed-Multiplying Gearing for Bicycles or other Machines," errors appear in the printed specification requiring correction as follows: In line 113, page 2, and line 2, page 3, the words "contiunous" should read *contiguous;* and that the said Letters Patent should be read with these corrections therein that the same may conform to the record of the case in the Patent Office.

Signed, countersigned, and sealed this 18th day of December, A. D. 1894.

[SEAL.]

JNO. M. REYNOLDS,
*Assistant Secretary of the Interior.*

Countersigned:
  JOHN S. SEYMOUR,
    *Commissioner of Patents.*